United States Patent
Lukashin et al.

(10) Patent No.: US 8,767,210 B1
(45) Date of Patent: Jul. 1, 2014

(54) METHOD FOR GROUND-TO-SPACE LASER CALIBRATION SYSTEM

(71) Applicant: The United States of America as represented by the Administrator of the National Aeronautics and Space Administration, Washington, DC (US)

(72) Inventors: Constantine Lukashin, Newport News, VA (US); Bruce A. Wielicki, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 46 days.

(21) Appl. No.: 13/713,033

(22) Filed: Dec. 13, 2012

Related U.S. Application Data

(60) Provisional application No. 61/644,071, filed on May 8, 2012.

(51) Int. Cl.
*G01J 4/00* (2006.01)

(52) U.S. Cl.
CPC .................................. *G01J 4/00* (2013.01)
USPC .......................................................... 356/369

(58) Field of Classification Search
CPC ..................................... G01J 4/00; G01J 4/04
USPC .................................................. 356/364, 369
See application file for complete search history.

(56) References Cited

U.S. PATENT DOCUMENTS

2014/0055785 A1\* 2/2014 Silny et al. .................... 356/364

\* cited by examiner

*Primary Examiner* — Roy M Punnoose
(74) *Attorney, Agent, or Firm* — Andrea Z. Warmbier

(57) ABSTRACT

The present invention comprises an approach for calibrating the sensitivity to polarization, optics degradation, spectral and stray light response functions of instruments on orbit. The concept is based on using an accurate ground-based laser system, Ground-to-Space Laser Calibration (GSLC), transmitting laser light to instrument on orbit during nighttime substantially clear-sky conditions. To minimize atmospheric contribution to the calibration uncertainty the calibration cycles should be performed in short time intervals, and all required measurements are designed to be relative. The calibration cycles involve ground operations with laser beam polarization and wavelength changes.

13 Claims, 3 Drawing Sheets

METHOD FOR GROUND-TO-SPACE LASER CALIBRATION SYSTEM

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

CROSS-REFERENCE TO RELATED PATENT APPLICATION(S)

This patent application claims the benefit of and priority to U.S. Provisional Patent Application Ser. No. 61/644,071, filed on May 8, 2012, the contents of which are hereby incorporated by reference in their entirety.

FIELD OF THE INVENTION

The present application relates to calibration of spaceborne radiometric sensors in reflected solar wavelength range, and in particular to a method of calibrating sensors on orbit utilizing a ground-based laser system, pointing at and tracking an instrument on board an orbiting satellite during nighttime with clear-sky atmospheric conditions. The calibration is achieved by transmitting expanded and uniform laser beam to the instrument in low Earth or geo-stationary orbit, and varying beam polarization and its wavelength within short time intervals.

BACKGROUND OF THE INVENTION

Quality of Earth Science data products based on observations from spaceborne radiometric sensors depends on their performance and accuracy on orbit. The accuracy of measuring reflected solar radiance can be affected by multiple factors. First, instruments with complex optics are sensitive to polarization. The response of such instruments is characterized before the launch, however, sensitivity to polarization can change on orbit significantly (e.g. Moderate Resolution Imaging Spectroradiometer (MODIS) launched on board the Terra satellite). Other factors are the degradation of optics, particularly in blue wavelength range below 500 nm (e.g. Clouds and Earth's Radiant Energy System (CERES) launched on board the Terra & Aqua satellites), and on-orbit changes in the instrument response to stray light. None of the existing sensors has the ability to monitor all these changes in calibration on orbit.

Accurate verification of space born sensors calibration on orbit plays a crucial role in meeting mission accuracy requirements. Onboard verification systems significantly impact mission costs by increasing the mass of instrumentation and required power. Also, onboard verification systems are not accessible for adjustment, maintenance, improvement, or repairs in the case of failure. Accordingly, a need exists for an improved calibration concept that does not suffer from the drawbacks of known calibration systems and methods.

SUMMARY OF THE INVENTION

The present invention is a method of calibrating an optical sensor, and more specifically, a method of calibrating an optical sensor onboard a satellite orbiting the Earth. The calibration is achieved by transmitting expanded and uniform laser beam to the instrument in low Earth or geo-stationary orbit, and varying beam polarization and its wavelength within short time intervals. The method is applicable to the instruments observing the reflected solar radiance. The method includes utilization of a ground-based laser, ground-to-space laser calibration (GSLC) system, with Continuous Wave (CW) laser, to generate a light signal on orbit (radiance) with controlled wavelength and polarization on the ground. The expanded beam with uniform top-hat profile, generated by ground-based laser system is aimed at and transmitted to the satellite, whereby entire aperture of optical sensor on the satellite is exposed to transmitted light. The optical sensor measures the intensity of incident signal on orbit while operations with beam polarization and wavelength are performed using optics on the ground.

One aspect of the method is to determine sensor sensitivity to polarization on orbit, which can be defined as instrument response to the same light intensity with different polarization. The concept of calibrating sensitivity to polarization of spaceborne sensor is illustrated in FIG. 1. The physical principle is to safely expose a radiometer on orbit to 100% linearly polarized light generated by the GSLC, and to map sensor response to polarization at different polarization angles within a short time period (seconds). The operations are considered when spacecraft overpasses the ground site during nighttime with clear atmospheric conditions. While the spaceborne sensor observes the laser signal, with its line-of-sight aligned with the laser beam vector, the direction of linear polarization of laser light is rotated 360 degrees using beam optics on the ground. There are three key advantageous points used in this approach: (a) polarization parameters of laser light are not affected by a clear atmosphere even if its intensity changes between the surface and TOA; (b) it is a relative measurement: the response of the spaceborne sensor should be the same at polarization angles 0°, 180° and 360°, and this feature provides a normalization reference for the calibration cycle; and (c) the measurements should be performed during a short time interval—within seconds. Although the Earth's atmosphere attenuates the intensity of the laser beam, during short time intervals (e.g. 5-10 seconds) the atmospheric conditions do not substantially change, and beam intensity should be as stable on orbit as it is on the ground. Since the calibration is relative, only stability of the beam is required, and therefore, application of a Continuous Wave (CW) laser is preferable choice.

Another aspect of the present invention is verification of instrument spectral response. The GSLC can be used to verify sensor spectral response on orbit by using lasers with different wavelengths or a tunable laser. In this case, the beam polarization is not required. The spectral verification measurements are also relative—ratio of instrument response in blue to its response in red and near-infrared (NIR) wavelengths as function of time from mission start date (generally, degradation in NIR is negligible). Atmospheric correction must be applied depending on the wavelength to improve accuracy of sensor calibration. Additionally, it is possible to map Relative Spectral Response (RSR) of narrowband and hyperspectral instruments by changing laser wavelength fast (e.g. 5-10 seconds) by tuning the laser around a central wavelength. The measurement is also relative, being normalized to the sensor response at the central wavelength.

The present invention can also be used to verify instrument response to both kinds of stray light on orbit, geometric and out-of-band, by choosing appropriate geometry of observations and laser wavelength. During nighttime the laser beam tracks the satellite as it comes up over the horizon until it goes down. Meanwhile, the on-orbit sensor acquires data in its nominal mode. All measurements are normalized to the signal from direct view of the laser site by the sensor to provide a relative measurement. The same operation is performed for many orbit tracks in order to develop an integrated stray light model. Verification of out-of-band stray light, or spectral cross-talk, can achieved by operating the laser at a selected wavelength and mapping instrument response in near-by bands.

The present invention includes several unique aspects or features, including radiometric measurement of ground-based laser signal for long time periods (e.g. 2-5 minutes) by an on orbit sensor. This requires satellite tracking by a laser system and also requires that the sensor is pointing at the laser site on Earth surface. All calibration measurements are relative, and the measurements are performed during short time intervals (i.e. the duration of the signal is about 5-10 seconds). Atmospheric effects cancel out due to the short time interval. The polarization parameter of laser light is not affected by clear atmosphere. Aerosol can de-polarize laser beam for 0.1-0.2% at most (forward scattering), but at a high altitude site this effects are negligible. Operations including radiometric calibration using polarization and wavelength operations have not previously been performed utilizing a ground-to-space laser.

These and other features, advantages, and objects of the present invention will be further understood and appreciated by those skilled in the art by reference to the following specification, claims, and appended drawings.

DETAILED DESCRIPTION OF THE INVENTION

Figure 1:
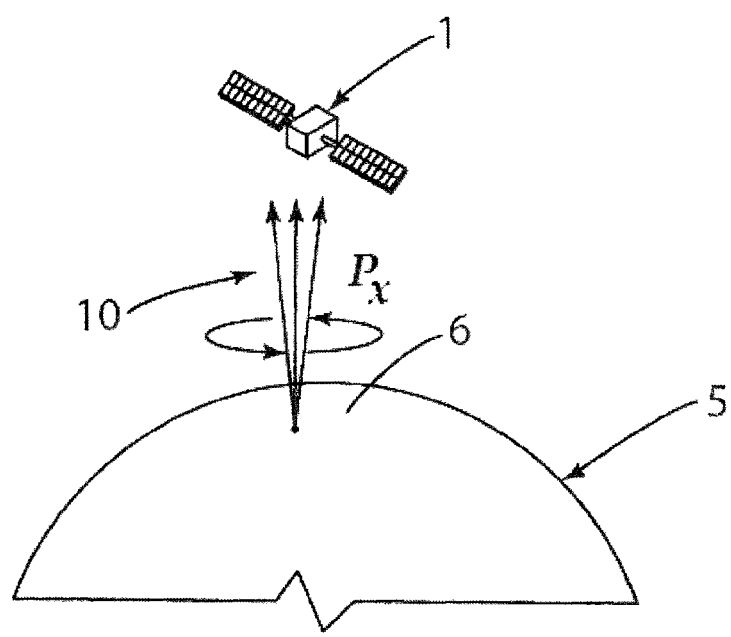
FIG. 1 is a partially fragmentary view of a satellite on orbit showing an operational concept for calibrating sensor sensitivity to polarization on orbit.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention utilizes a ground-based laser system to generate a controlled beam that is aimed at a satellite passing overhead. The response of on board sensors to changes in polarization and/or wavelength is utilized to calibrate the sensors to account for degradation of the sensors. The ground based laser system can also be utilized to measure sensor response to stray light. This information can be utilized to develop a stray light model for calibrating the sensors.

The above operations are preferably operated at nighttime clear-sky atmospheric conditions. Clear-sky atmospheric conditions means an atmospheric transmittance level of about 80-100% (in optical window wavelength range) and a level of turbulence ($C_N^2$) of less than or equal to about $10^{-13}$. Optimal conditions are usually found at mountain top levels on Earth during nighttime, which is when solar reflection is substantially eliminated. For purposes of this invention, nighttime occurs when the solar zenith angle is equal or greater than about 100 degrees.

Ground-to-Space Laser Calibration (GSLC) System:

A monitored Continuous Wave (CW) laser system is used to enable the knowledge of the beam intensity at about 0.1%. The required power, transmitted by the Laser System, depends on the type of the target sensor and its orbit. For most application the transmitted power up to 3 Watts should be sufficient to achieve high signal-to-noise calibration measurements. The system produces a fully polarized beam, and with accurate determination of polarization angle and ability of changing the beam within short time intervals (e.g. 5-10 seconds). Also, the laser light profile at satellite altitude must be uniform within required accuracy, so called "top-hat" beam profile. This beam profile mitigates the effects of atmospheric turbulence. Several technologies can be utilized to ensure sufficient uniformity of the laser beam profile. For example, optical diffusion techniques can be used to obtain uniformity of laser beam cross-section within a few percent RMS. The laser is mounted on a 2-dimensional elevation-over-azimuth gimbal, with the ability to point and track the satellites in low Earth and geo-stationary orbits. As described in more detail below, the laser system can be utilized to determine instrument sensitivity to polarization, instrument response to spectral degradation, and instrument response to stray light on orbit by performing the operations with beam optics on the ground.

Calibration of Sensitivity to Polarization:

Spaceborne sensors with a complex optical design are sensitive to the polarization of incoming light in the reflected solar wavelength range: from 0.25 µm to 3 µm. Because reflected light at the top-of-atmosphere (TOA) is linearly polarized to varying degrees (depending on scene type, view geometry, and wavelength), the sensitivity to polarization is a source of radiometric uncertainty. Generally, response of these instruments to polarization is characterized before launch, and sensitivity can be 2%-4% for known imaging radiometers, depending on band (e.g. MODIS, VIIRS). The sensitivity to polarization may be up to 10%-15% for known hyper-spectral instruments (e.g. SCIAMACHY). Sensitivity to polarization tends to change on orbit, particularly over a long operational time period as optics degrades. Currently, there is no robust approach to monitor instrument sensitivity to polarization on orbit with high accuracy.

With reference to FIG. 1, an operational concept for calibrating sensor sensitivity to polarization on orbit includes utilizing an expanded, uniform, and linearly polarized laser beam 10 is transmitted to an over-passing satellite 1 on orbit during nighttime clear atmosphere conditions, and, as radiometer onboard observes laser signal, direction of linear polarization is rotated 360° in short time intervals (seconds). The line-of-sight of target sensor is aligned with the laser beam vector. Variable beam polarization direction is indicated with Px, and Earth is noted with 5. A satellite 1 having onboard sensor orbits about the Earth 5. The satellite 1 may be in a low Earth orbit (LEO) or a geostationary Earth orbit (GEO). The satellite 1 carries radiometric sensor which measures reflected solar radiance.

According to one aspect of the present invention, expanded, uniform, and linearly polarized laser beam 10 is pointed at and transmitted to the over-passing satellite 1 during nighttime clear atmosphere conditions. The physical principle is to expose the radiometer on orbit to 100% linearly polarized light generated by a ground-based laser, and to map sensor response to polarization at different polarization angles within short time intervals. As an onboard radiometer observes the laser signal, with its line-of-sight co-aligned with laser beam vector (sensor pointing), direction of the linear polarization is rotated 360° in a short time period using beam optics on the ground 6. As the satellite 1 passes over, the on board sensor makes measurements continuously, typically from 15 to 100 per second. Time period of satellite overpass is about 2 minutes on average. During this 2 minutes the sensor "stares" at, or is in substantially direct visual communication with, the laser site while the laser is pointing and tracking the satellite. To ensure atmospheric attenuation is cancelled, the complete calibration cycle is made quickly. This ensures that the laser beam goes through the same or almost the same atmosphere. Thus, it is preferable to have complete rotation of the polarization direction, or switch between blue and red wavelength in 5-10 seconds. Each 5-10 second calibration cycle is an independent calibration "event," which is analyzed off line after all data is merged. The product of interest is relative, the goal is to obtain ratio of sensor response to various polarization to its response to 0, 180, and 360 degree polarization direction:

$$R=S(p)/S(0)$$

$$R=S(p)/S(360)$$

$$R=S(p)/S(180)$$

The S(0), S(180) and S(360) responses are compared to each other and should be similar if the atmosphere was stable during calibration. The responses are used to determine a calibration parameter to increase the accuracy of the sensor.

The instrument response to the same light intensity with varying polarization constitutes its sensitivity to polarization.

There are several key factors involved in this approach. First, polarization parameters of laser light (degree and direction of linear polarization) are not affected by a clear atmosphere, even if its intensity changes between the surface and TOA. This can be confirmed in detail using polarimetric data from existing spaceborne sensors (e.g. PARASOL) over clear-sky ocean scenes, and modeling results using radiative-transfer approach. Second, the calibration measurements are relative—the response of the spaceborne sensor should be the same at polarizations direction 0°, 180° and 360°. This restricting condition provides a quantitative measure of verification accuracy and normalization reference for entire calibration cycle. Third, although the Earth's atmosphere attenuates intensity of the laser beam, during short time intervals (e.g. 5-10 seconds) the atmospheric conditions do not change, and beam intensity should be as stable on orbit as it is on the ground. For relative measurements, only stability of the beam intensity is required, not the absolute radiance. The described approach should be applicable to various wavelengths with a focus in the blue wavelength range, where the sensitivity to polarization is usually at the largest levels.

Calibration of Optics Degradation:

The ground-based laser system can be used to verify sensor spectral response on orbit by using lasers with different wavelengths or a tunable laser. In this case, the beam polarization is not required, and expanded, uniform, and non-polarized beam is pointed at and transmitted to on orbit sensor during nighttime clear atmosphere conditions. As an onboard radiometer observes the laser signal, with its line-of-sight co-aligned with laser beam vector (sensor pointing), the wavelength of the laser beam is alternated between blue and near-IR within short time intervals (e.g. 5-10 seconds). The spectral calibration measurements comprise a ratio of instrument response in blue to its response in near-IR wavelengths as function of time from mission start date (generally, degradation in near-IR is negligible), and the spectral calibration measurements are therefore relative. Atmospheric correction must be applied depending on the wavelength to improve accuracy of sensor calibration. Additionally, it is possible to map Relative Spectral Response (RSR) of narrowband and hyperspectral instruments by tuning the laser wavelength fast (seconds) around the central wavelength. To make measurement relative, it should be normalized to the sensor response at the central wavelength.

Figure 2:
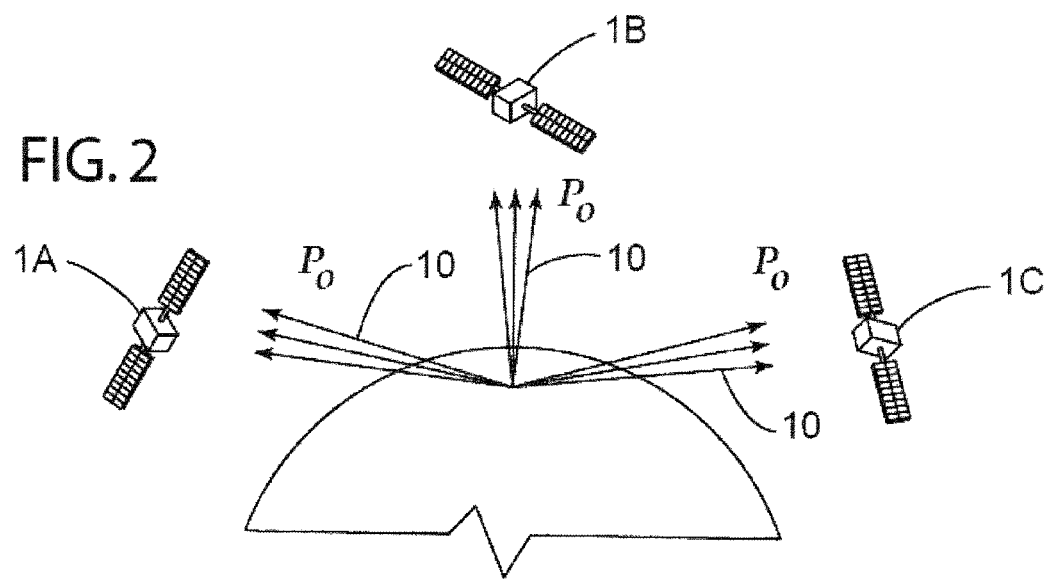
FIG. 2 is a partially fragmentary view of a satellite on orbit shown an operational principle for mapping stray-light response.

Calibration of Response to Stray Light:

The ground-based laser system and method according to the present invention may also be utilized to verify the instrument response to stray light on orbit. In general, there are two different types of stray light. The first type is geometric by nature, meaning that light may not originate directly from the field of view of the imaged pixel. Depending on the severity of the stray light, this can adversely affect the quality of remote sensing imagery and be difficult to correct. The second type is spectral by nature, and it can occur if an instrument is sensitive to out-of-band light. The system and method of the present invention can be applied to both kinds of stray light verification on orbit by choosing appropriate geometry of observations and the laser beam wavelength. FIG. 2 is a schematic drawing showing use of a ground-based laser system to determine variations in the effects of geometric stray light with respect to on board instrument. According to this aspect of the present invention, an expanded, uniform, and non-polarized laser beam 10 is transmitted to target sensor on an orbit at various locations (1A, 1B and 1C) during nighttime clear-sky atmosphere conditions, as satellite passes from limb to limb (from locations 1A to 1C). The sensor operates in its nominal data collecting mode, e.g. cross-track scanning. All stray light measurements should be normalized to the direct view of the laser site.

For this verification operation, it is preferable that laser beam is not polarized. Therefore, during nighttime and clear-sky atmosphere conditions expanded, uniform, and not-polarized laser beam is pointed at and transmitted to the satellite 1 as it comes up over horizon, moving from location "1A" to location "1C." During this time, the on orbit sensor acquires data, operating in nominal data collecting mode (e.g. cross-track scanning). To make this calibration approach relative, all measurements are normalized to the sensor direct view of the laser site. The operation is performed for many orbit tracks in order to develop an integrated empirical stray light model comprising the normalized measurements at a plurality of angles relative to the direct view orientation. This setup is comparable to having "controllable" stars with adjustable view geometry and intensity. Using coincident meteorological data, theoretical atmospheric corrections can be used to improve the accuracy of the derived stray light model.

The calibration of out-of-band stray light, or spectral crosstalk, can achieved by operating the laser at certain wavelength and mapping instrument response in the near-by bands. In this case the line of-sight of laser beam and sensor must be co-aligned.

Figure 3:
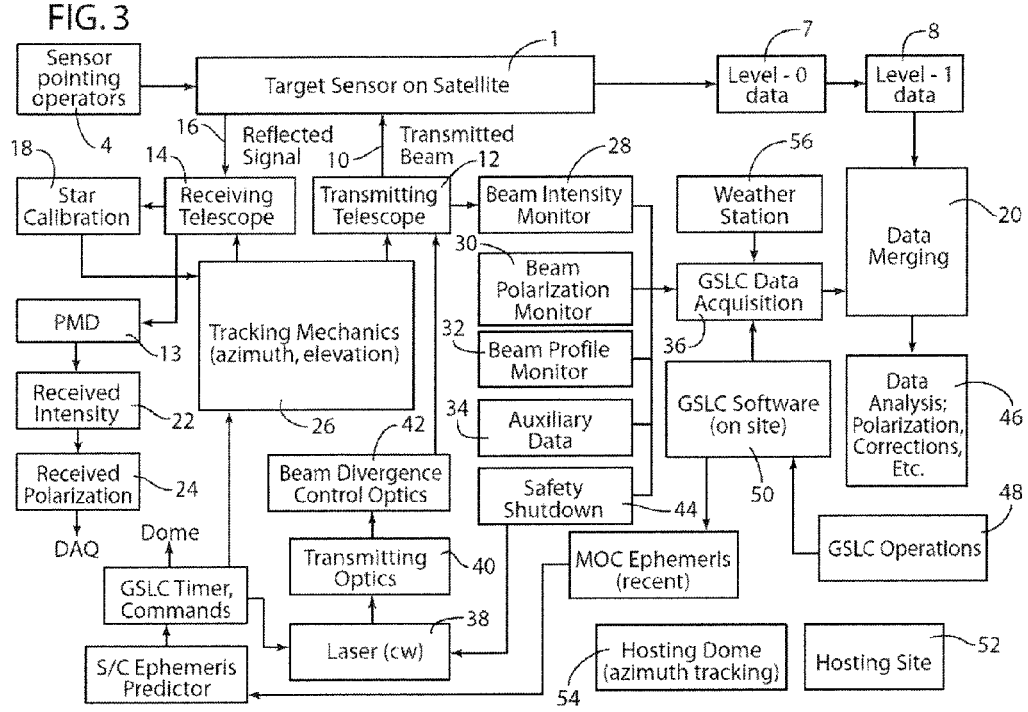
FIG. 3 is a block diagram of a ground-based laser system for radiometric calibration of sensor on orbit. Suggested subsystem structure reflects methodology of the present invention.

Diagram of Ground-to-Space Laser Calibration (GSLC) System:

With further reference to FIG. 3, the radiometric sensor on satellite 1 comprises an on-orbit target at which laser beam 10 is directed from a transmitting telescope 12. During calibration sequence, as the satellite 1 over-passes the GSLC site, the target sensor receives input from sensor pointing operations 4 and points at the laser ground location, so that sensor line-of-sight is co-aligned with laser beam vector. Output of the target sensor measurement is raw Level-0 data 7, which is utilized to generate radiometric Level-1B data product 8. Using accurate time record, the sensor Level-1B data is merged with laser system diagnostic, monitoring and auxiliary data (28, 30, 32, 34, 44), and with coincident meteorological parameters provided by a weather station.

Tracking mechanics 26 is used to point the transmitting telescope 12 and laser beam 10 to ensure it is incident on the satellite 1. The beam is generated by a Continuous Wave (CW) tunable laser 38, formed into the required uniform beam profile and polarization by transmit optics 40, and then expanded by beam divergence control optics 42. The beam preferably has a uniform "top hat" profile with a RMS of about 1-2% over the central part of the beam. The beam is preferably expanded, with a divergence of about 7-10 arcseconds. The laser diagnostic system includes a beam intensity monitor 28, a beam polarization monitor 30, a beam profile monitor 32, and sensors providing auxiliary data 34. A safety shutdown feature 44 included for ability to turn off CW laser 38 power according to a predefined criteria of operations (e.g. approaching aircraft). Part of laser beam transmitted to orbit 10 is reflected back to ground by the satellite 16. A receiving telescope 14 receives reflected laser signal from satellite 16 and provides data to a Photo Multiplying Detector (PMD) 13. The reflected signal is utilized to determine received light intensity 22 and polarization 24. The receiving telescope 14 is also used for calibration of tracking mechanics (star calibration method, 18). Data from the beam intensity, beam polarization, and beam profile monitors 28, 30, and 32 respectively, and auxiliary data 34 are gathered at data acquisition element 36, and then supplied to data merging element 20. The merged data is then analyzed offline at 46. An auxiliary weather station 56 provides meteorological parameters to the data acquisition element 36. The GSLC operations 48 are implemented via the on-site GSLC software 50. The GSLC system is located at a hosting site 52 having a hosting dome 54 with azimuth tracking. The dome 54 is preferably an elevated dome that is about 20 feet from the ground to avoid a thermal boundary layer.

The present invention has several advantages over space-based (onboard satellite) calibration/verification systems. Because it is a ground-based implementation, it is accessible for adjustments, development, maintenance, etc. Its calibration traceability to NIST standards can be straight-forward in comparison to onboard calibration devices. Operations according to the present invention are not restricted by on-orbit issues (SIC, fuel, etc.), the GSLC system can be used for calibration of multiple spaceborne sensors: including hyperspectral and narrowband imagers, and polarimetric instruments.

Geolocation of the laser system is an important factor. The high altitude sites of large optical telescope arrays are very appropriate. For optical telescopes, most ground-based observatories are located far from major centers of population to avoid the effects of light pollution. The ideal locations for modern observatories are sites that have dark skies, a large percentage of clear nights per year, dry air, and are at high elevations. At high elevations, the Earth's atmosphere is thinner, water vapor is low, the atmospheric turbulence is reduced, and thereby minimizing the effects of atmospheric conditions and resulting in better astronomical "seeing" and smaller laser beam wandering. Sites that meet the above criteria for modern observatories include, but not limited to, the southwestern United States, Hawaii, Canary islands, the Andes, and high mountains in Mexico such as Sierra Negra. Major optical observatory sites include Mauna Kea Observatory (Big Island of Hawaii), Kitt Peak National Observatory (Arizona-Sonoran Desert), Fred Lawrence Whipple Observatory (Mount Hopking, Ariz.) in the USA, Roque de los Muchachos Observatory in Spain, and Paranal Observatory in Chile. These sites also have existing infrastructure such as meteorological and computing facilities, network availability, etc.

For obtaining comprehensive information about the calibration measurements, laser monitoring and diagnostics data may be recorded with necessary frequency (beam intensity, polarization, beam divergence, and beam profile). Recording rate up to 1 kHz is appropriate for Earth observing sensors, and it can be accomplished easily with available data acquisition technology. Meteorological data should be recorded at the time of calibration measurement and operations. Such data is available at large optical telescope sites (or generated by auxiliary weather station), and it enables necessary corrections for off-line data analysis. Also, uncertainty contribution from stray light are preferably minimized (e.g. Moon location.) Also, as the satellite is exposed to the laser light, the amplitude of the reflected light can be measured accurately and frequently on the ground, and its variation during the calibration process can be estimated. Operations with large variations can be rejected as not meeting required stability. Although the reflective property of a spacecraft can change long-term, it is assumed to be constant during the calibration process of a few seconds.

What is claimed is:

1. A method of calibrating an optical sensor on board a satellite orbiting the earth, the method comprising:
    utilizing a ground-based laser to generate a linearly polarized light signal having a substantially constant polarization and constant intensity;
    aiming the light signal from the ground-based laser at a satellite whereby the light signal is incident on an optical sensor on the satellite;
    rotating the direction of the polarization of the light signal;
    measuring a response of the optical sensor as the direction of the polarization is rotated;
    determining a calibration parameter based on comparing the response of the optical sensor whereby the optical sensor can be calibrated to increase an accuracy of the optical sensor.

2. The method of claim 1, wherein:
    the direction of the polarization is rotated 360°.

3. The method of claim 2, including:
    comparing the response of the optical sensor at polarization angles of 0° to 360° to quantify verification accuracy.

4. The method of claim 2, wherein:
    rotation of the direction of the polarization from 0° to 360° occurs in less than about ten seconds.

5. The method of claim 1, wherein:
    the light signal comprises light in the blue wavelength range.

6. The method of claim 1, wherein:
    the optical sensor is pointed at the ground-based laser.

7. The method of claim 1, wherein:

at least a portion of the light signal is reflected back towards the ground; and including:

measuring the amplitude of the reflected portion of the light.

8. The method of claim 7, including:

determining a criteria concerning a maximum acceptable variation in the amplitude of the reflected light;

comparing a variation in amplitude of the reflected light to the criteria; and accepting the measured response of the optical sensor only if the variation in the amplitude of reflected light meets the criteria.

9. The method of claim 1, wherein:

the light signal comprises a first light signal having a first wavelength; and including:

generating a second linearly-polarized light signal having a second wavelength that is not equal to the first wavelength; and:

comparing the responses of the optical sensor to the first and second light signals.

10. The method of claim 9, wherein:

the results of the comparison are utilized to calibrate the optical sensor to account for degradation of the optical sensor.

11. The method of claim 10, wherein:

the first light signal comprises red light and the second light signal comprises blue light.

12. The method of claim 1, wherein the light signal from the laser is expanded to diverge about 7-10 arcseconds with uniform top hat beam profile.

13. The method of claim 9, wherein the calibration parameter is based on relative changes of the response of the optical sensor.

* * * * *